US010290199B2

(12) United States Patent
Kumar et al.

(10) Patent No.: US 10,290,199 B2
(45) Date of Patent: May 14, 2019

(54) SYSTEM AND METHOD FOR REMOTE TEST ADMINISTRATION AND MONITORING

(71) Applicant: Verificient Technologies, Inc., New York, NY (US)

(72) Inventors: Rajnish Kumar, Princeton, NJ (US); Apratim Dutta, New York, NY (US)

(73) Assignee: Verificent Technologies, Inc., New York, NY (US)

( * ) Notice: Subject to any disclaimer, the term of this patent is extended or adjusted under 35 U.S.C. 154(b) by 0 days.

(21) Appl. No.: 14/554,509

(22) Filed: Nov. 26, 2014

(65) Prior Publication Data

US 2015/0077259 A1    Mar. 19, 2015

Related U.S. Application Data

(63) Continuation of application No. 13/106,279, filed on May 12, 2011, now Pat. No. 8,926,335.

(60) Provisional application No. 61/333,925, filed on May 12, 2010.

(51) Int. Cl.
*G08B 21/18* (2006.01)
*G09B 7/00* (2006.01)
*H04N 7/18* (2006.01)

(52) U.S. Cl.
CPC ............ *G08B 21/182* (2013.01); *G09B 7/00* (2013.01); *H04N 7/18* (2013.01)

(58) Field of Classification Search
CPC ... G09B 5/00; G09B 5/02; G09B 7/00; G09B 7/02; G08B 21/18; G08B 21/182; H04N 7/18
USPC .......................................... 434/219, 322–365
See application file for complete search history.

(56) References Cited

U.S. PATENT DOCUMENTS

| 7,929,733 | B1 * | 4/2011 | Lehnert | G06K 9/00885 382/115 |
| 2005/0277102 | A1 * | 12/2005 | Gillette | G09B 5/00 434/350 |
| 2007/0117083 | A1 * | 5/2007 | Winneg | G09B 7/00 434/350 |
| 2012/0135388 | A1 * | 5/2012 | Foster et al. | 434/362 |

* cited by examiner

*Primary Examiner* — Timothy A Musselman
(74) *Attorney, Agent, or Firm* — Vedder Price PC

(57) ABSTRACT

A system for test administration including a memory, a processor and a biometric reading unit with a program in the memory executing the steps of receiving measurements from the biometric reading unit, the measurements being other than video and audio, identifying suspect behavior from the measurements, displaying a video feed from the testing station in response to the identification of the suspect behavior.

1 Claim, 9 Drawing Sheets

SYSTEM AND METHOD FOR REMOTE TEST ADMINISTRATION AND MONITORING

PRIORITY CLAIM

This patent document is continuation application of U.S. patent application Ser. No. 13/106,279 filed on May 12, 2011, which claims the benefit of U.S. Provisional Patent Application No. 61/333,925 filed on May 12, 2010, and the entire content of these applications is expressly incorporated herein for all purposes to the extent permitted by law.

TECHNICAL FIELD

This patent document generally relates to remote test administration and more particularly to a system and method to manage the administration of tests to a large number of examinees via a remote monitoring and proctoring system that automatically assists the proctor and conserves network resources.

BACKGROUND

Institutions such as colleges, universities, other schools and businesses often utilize self-administered or take-home tests because of the increased flexibility and convenience they afford. Under current self-administered test regimes, organizations are required to either trust the examinees to not cheat or otherwise violate the testing rules or utilize a remote online proctor to manually monitor examinees or test-takers via webcam transmitted images or data transmitted over network connection webcams. The first approach of simply trusting examinees and test-takers provides no safe guard against potential dishonesty while the second approach of using one or more remote proctors is resource intensive and not scalable.

Remote proctoring or monitoring utilizing a computer's webcam and audio systems to facilitate manually watching and monitoring an examinee throughout the test is impractical and non-scalable for a number of reasons. For example, a proctor can monitor multiple webcam feeds simultaneously but audio feeds from each of the multiple systems cannot be monitored accurately because background noise from any one examinee can suppress or overwhelm the audio feeds from the remaining systems. Manual monitoring may further be hampered by network or communication bandwidth limitations. Bandwidth limitations can create a bottleneck when audio and video information are transmitted from multiple systems to the location of the proctor for monitoring. In particular, the bandwidth available at the proctor side limits the number audio and video feeds from examinees that can be simultaneously monitored. Finally, manual monitoring of a large number of video screens may be hampered by the proctor's ability to multitask and focus. For example, continuously monitoring a large number of examinees while resolving any questions or issues with the exam reduces and divides the proctors attention and focus on any single task. This reduced focus, in turn reduces the effectiveness of the overall monitoring process and procedure.

Because of the above-discussed scalability problems inherent in manual remote proctoring, a proctor only monitors a small number of examinees at a time (about 2 to 4 examinees per proctor per test). This type of proctor-intensive monitoring is expensive because the supply of trained professionals who can comfortably use conferencing/proctoring software system is limited. Moreover, manual monitoring tends to interfere with an examinees test experience because the downloading and saving of test data and the transport or communication of a video stream can severely limit network performance and drain network resources.

SUMMARY

This patent document generally discloses a system and method for multi-modal sensing and correlation of data collected from a plurality of examinees to identify possible dishonest behaviors. The disclosed system and methods utilize, for example, vision-based cues, audio cues, test data, and key-stroke patterns, or any combination thereof, to reduce the number of false positives and negatives. In other embodiments, the disclosed system and method may utilize, for example, advanced vision cues (e.g., eye movement, facial expressions, etc) that can further improve the results and identification of possible dishonest behaviors. In order to limit the impact on network resources, the disclosed system and method transmit extracted cues from webcams (instead of sending the whole video for remote monitoring) to a remote server for correlation. If, based on an examination of the extracted cues, an examinee is suspected of dishonest behavior; then the examinee's video can be transported for manual monitoring. The system and method disclosed herein identifies possible cheating behavior and helps to focus or direct the proctor to a specific individual or examinee. The proctor, in turn, makes the final decision as to whether a person is cheating after being focused on a situation that has been determined to have a high likelihood of cheating or other dishonest behavior. In this way, a single monitor or proctor can oversee numerous examinees while providing effective and focused support. Alternatively, the decision as to whether a person is cheating may be made by a computer program or algorithm configured to provide a detailed analysis of the examinee's behavior.

In one embodiment, a system for remote test administration is disclosed. The system includes a testing station having a processor and a memory in communication with the processor. The memory configured to store processor executable instructions configured to: acquire biometric information related to a user, wherein the user is substantially adjacent to the testing station; identify at least one biometric vector within the acquired biometric information; and communicate the identified biometric vector. The system further includes a monitoring station configured to receive the biometric vector communicated by the testing station, the monitoring station having a processor and a memory in communication with the processor. The memory configured to store processor executable instructions configured to: compare the received biometric vector to a stored biometric vector and determine a recognition weight; group the biometric vector into one or more polling clusters based on the recognition weight and one or more recognition thresholds; and monitor the user at the testing station based on feature vectors associated with the one or more polling clusters.

In another embodiment, a method for remote test administration is disclosed. The method includes acquiring digital biometric information related to a user interacting with a testing station; identifying at least one biometric vector based on the acquired digital biometric information; communicating the identified biometric vector to a centralized monitoring station for compiling with a plurality of identified biometric vectors acquired from a plurality of different users; comparing the identified biometric vector to the plurality of identified biometric vectors to determine a recognition weight; grouping the identified biometric vector into one or more polling clusters based on the recognition weight and one or more recognition thresholds; and monitoring the user at the testing station based on feature vectors associated with the one or more polling clusters.

In yet another embodiment, a method of test administration is disclosed. The method includes identifying an exam pattern for a test to be administered; comparing the identified test pattern to the stored test patterns of a plurality of tests to be administered; grouping the identified exam pattern with one or more of the stored test patterns such that digital biometric information related to a user associated with the exam pattern for the test to be administered can be grouped with digital biometric information related to a plurality of users associated with the stored test patterns of the plurality of tests to be administered; monitoring the digital biometric information of the user as the user participates in the test to be administered; and monitoring the digital biometric information of the plurality of users associated with the stored test patterns, wherein the digital biometric information of the plurality of users is grouped with the digital biometric information of the user and wherein the plurality of users are monitored participating in the plurality of tests to be administered.

Other embodiments are disclosed, and each of the embodiments can be used alone or together in combination. Additional features and advantages of the disclosed embodiments are described in, and will be apparent from, the following Detailed Description and the figures.

DETAILED DESCRIPTION

Figure 1:
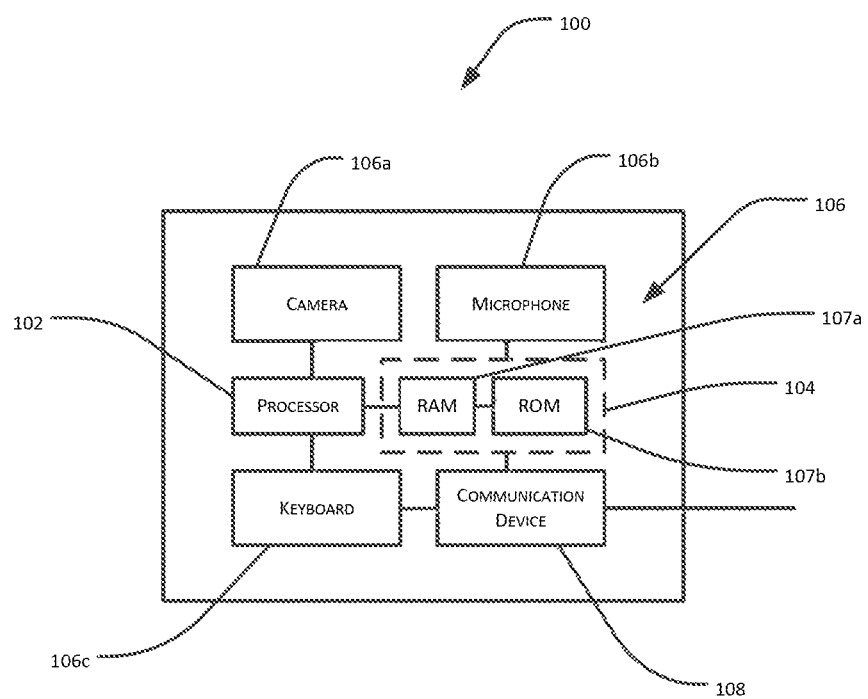
FIG. 1 illustrates a block diagram of an exemplary testing station for use in an remote test administration system and method as disclosed herein.

This patent document relates to a system and method to manage the administration of tests to a large number of examinees via a remote monitoring and proctoring system that automatically assists the proctor and conserves network resources. The disclosed system and method further (1) addresses privacy concerns arising from remote test administration and monitoring; (2) provides for efficient network bandwidth utilization; and (3) manages computational resource of both the examinee and monitor's systems.

The disclosed system and method addresses privacy concerns typically arising from the use of an examinee's webcam to administer remote and/or online test. A primary concern, from examinee or user's point of view, is the probable use of webcams to monitor students and their behaviors via video streaming. The disclosed system and method addresses the privacy concerns by relying on biometric information and other patterns in place of a continuously transmitted video stream between the examinee's testing station to a remote server or monitoring station. In one embodiment, the disclosed system and method extracts cues, such as biometric information, from the digital images and/or video gathered at the user's testing station (e.g., a laptop or desktop computer) and communicates only an extracted feature vector to the server for statistical analysis. If the server-side analysis hints or otherwise determines the examinee to be an outlier, only then will video streaming feature be activated. To further enhance or protect the examinee's privacy, activation of streaming video may require an affirmative action on the examinee's part such as, for example, selecting an "accept" or "acknowledge" button. Moreover, the extent or degree of video-based cues are extracted and transmitted to the server may be configured or otherwise defined to provide flexible and varying levels of user privacy. If privacy is not a concern, or is not a primary concern, the disclosed system and method may be configured to facilitate feature extraction at the server-side. By allowing for server-side feature extraction, a system having a less powerful processor (i.e., a system with less computation resources available) and a high bandwidth connection (e.g., a smartphone with a 802.11n or 4G wireless connection) may be utilized by an examinee.

The disclosed system and method provides for efficient network bandwidth utilization to facilitate both the examinee's online test experience and the remote monitoring if the examinee during the test. Typical online test require an active Internet connection to access the test. Activation of a webcam-based monitoring system to transmit audio and/or video streams or feature vectors, the monitoring system will compete with the available network bandwidth with the online test itself and may deteriorate the experience of giving online tests. For example, the disclosed system and method is network aware and configured to prioritize data to ensure that the examinee can interact with and/or download testing materials as needed from the test server.

The disclosed system and method manage the computation resource of the examinee's computer by controlling the feature extraction and processing of the gathered biometric information. In operation, the feature extraction is performed on the biometric information to produce a feature vector that may, in turn, be transported to a testing server for further analysis. The disclosed system and method controls and manages which of the potential features to be extracted in order to ensure that the computation resources needed for running a test smoothly remain available to the examinee. In this way, the present invention safeguards the examinee's interaction with the online testing server and system while extracting the features determined to be relevant for outlier detection. As used herein, the term "biometric information" is intended to encompass measurements, data, patterns or details that may be utilized, in a processed or unprocessed state, to identify an individual. The measurements, data, patterns or details may include, but are not limited to, digital images and video, audio files or streams, keystroke and keyboard information as well image vectors and feature vectors extracted therefrom.

The disclosed system and method is configured to minimize dishonest behavior by utilizing a number of different sandboxing and security techniques to control the resources accessible by the examinee. For example, the disclosed remote test administration software may be implemented as a virtual machine that provides a limited access environment over the processes and devices that can access the test data while blocking network access to anything by the online test. The virtual machine may be configured to provide full control of the examinee's hardware thereby limiting the examinee's ability to perform unauthorized activities. Similarly, operation of that disclosed remote test administration software may be limited or restricted to one or more pre-identified models of laptop or desktop. For example, in order to utilize the disclosed remote test administration software, the examinee's testing station may be restricted to specific model and/or configuration of computer. In particular, the disclosed remote test administration software may gather and compare the hardware signature of the examinee's laptop or desktop computer to a stored (and approved) hardware signature. In this way, the exemplary remote test administration software may be configured to restrict access to device hardware resources by requiring explicit OS permission. Furthermore, the disclosed remote test administration software may require the use of pre-identified or qualified webcams in order to ensure a minimum video and/or image quality is maintained. In this way, the lens and focal length of the webcam can be specified along with basic pan-tilt-zoom (PTZ) functionality. Webcam placement and lighting conditions at the test location also be specified according to a pre-specified guideline. Examinee compliance with the specified guidelines can be automatically verified utilizing computer vision based techniques.

FIG. 1 illustrates an exemplary block diagram of a testing station 100 that may be utilized by an examinee. As previously discussed, the testing station 100 may be any known laptop or desktop computer configured or built to a pre-determined hardware specification. For example, the testing station 100 may include a processor 102 in communication with a memory 104. The memory 104 may include volatile memory or RAM 107a, non-volatile memory or ROM and other storage 107b. The memory 104 is non-transitory, such as being embodied as a device. The memory 104 may be configured to store the disclosed remote test administration software and other processor executable logic or instructions. The memory 104 may further include the operating system (OS), drivers and programs that may be accessed or otherwise controlled by the virtual machine environment implemented by the disclosed remote test administration software. The testing station 100 may further include one or more input devices 106 such as a webcam 106a, a microphone 106b and a keyboard or touchscreen 106c. These input devices 106 may accept commands or information from an examinee and/or may be utilized by the disclosed remote test administration software to gather biometric information about the examinee.

The testing station 100 may further include a communication module 108. The communication module 108 may be a wired or wireless communication device configured to provide access to a local area network (LAN) and/or a wide area network (WAN). For example, the communication module 108 may be configured to communicate utilizing Ethernet protocols, wireless protocols such as IEEE 802.11x or any other known or contemplated communication scheme or methodology.

Figure 2:
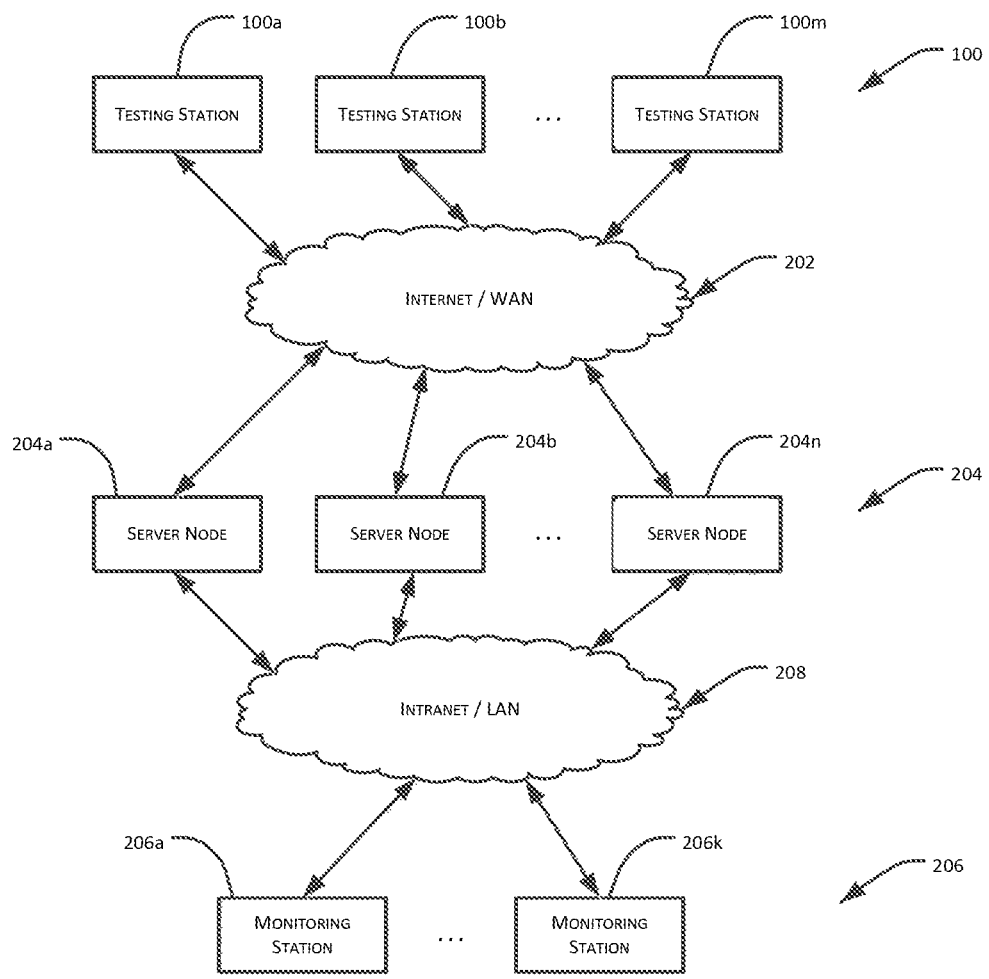
FIG. 2 illustrates a block diagram of the exemplary remote test administration system including the test station shown in FIG. 1.

FIG. 2 illustrates a block diagram of an exemplary remote test administration system 200. In particular, the exemplary remote test administration system 200 includes a plurality of testing stations 100 in communication with a wide area network 202 such as the Internet. The plurality of testing station 100 are individually identified as testing stations 100a to 100m to indicate that numerous examinees may simultaneously utilize system and software. The remote test administration system 200 includes a plurality of servers or server nodes 204 in communication with the plurality of testing stations 100 via the wide area network 202. The plurality of server nodes 204 are individually identified as servers 204a to 204n to indicate that numerous servers may be simultaneously configured to receive and process biometric information captured, processed and provided by the testing stations 100.

The remote test administration system 200 further includes multiple proctor or monitoring stations 206 in communication with the server nodes 204 via a network 208. The multiple monitoring stations 206 are individually identified as monitoring station 206a to 206k to indicate that numerous proctors may be simultaneously configured to receive and process biometric information captured, processed and provided by the testing stations 100.

In operation, the monitoring station 206 may each receive biometric information directly from multiple testing stations 100. Alternatively, each monitoring station 206 may receive processed or evaluated biometric information from one or more server nodes 204. The monitoring stations 206 may each, in turn, monitor one or more testing stations 100 utilizing the processed or evaluated biometric information. The monitoring stations 206 may further monitor identified or outlier testing stations 100 by utilizing or controlling the input devices 106. In this way, a proctor at one of the monitoring stations 206 may directly watch or communicate with an examinee as they interact with an online test or examination.

Figure 3:
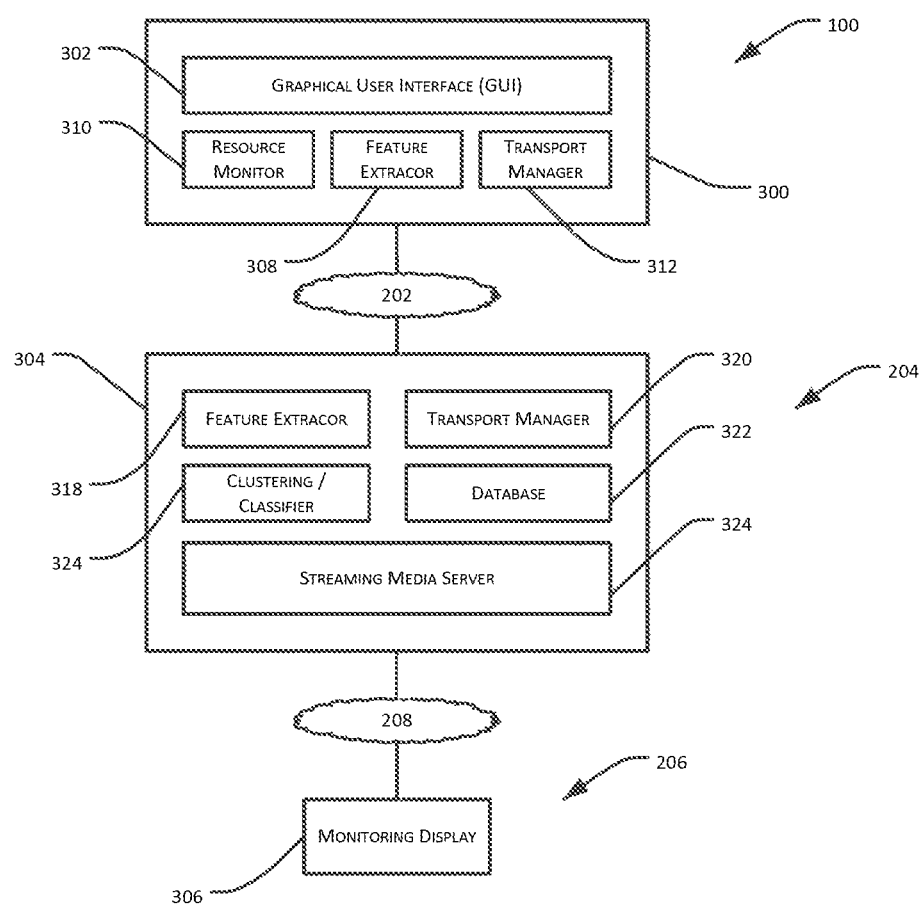
FIG. 3 illustrates a diagram of the logical elements or software modules that may be implemented by the components or elements of the exemplary remote test administration system shown in FIG. 2.

FIG. 3 illustrates a logical diagram of the software components operable within the testing stations 100, server nodes 204 and monitoring stations 206. The exemplary remote test administration system includes three main components (1) client-side components 300 operable within the testing station 100 and configured to extract features from the gathered biometric information such as webcam video, audio and other contextual data; (2) server-side components 304 operable within the server nodes 204 to store data and analytics for identifying outliers based on the gathered and/or processed biometric information, and (3) admin-side components 306 operable within the monitoring stations 206 to monitor/act on the videos of the outliers.

The client-side components 300 may be stored in the memory 104 of each testing station 100 and executed by the processor 102. For example, a graphical user interface (GUI) 302 may be stored in the memory and presented to the examinee via the touchscreen 106c. The GUI 302 provides the means by which the examinee may interact with the disclosed remote test administration system. Furthermore, the GUI 302 accesses and cooperates with a feature extractor routine or module 308; a resource monitor or module 310 and a transport manager or module 312. The GUI 302 may further include or cooperate with a query handler routine or module (not shown individually) that is configured to address queries generated by the proctors at one or more testing station 206 regarding the one or more examinees participating in an online examination.

The feature extractor 308 generates at least one feature vector based on biometric information such as an image or a series of images (video). A feature vector, in this exemplary embodiment, is a set of <attribute, value>tuples associated with a time-span or period in which the features were extracted. The feature extractor 308 calculates a weighted average of feature-vectors generated in connection with the individual images captured by webcam 106a or other input device 106 the during that time-span or period of interest. The set of features or feature-vectors that are extracted from images depends upon multiple factors: context, resource availability, and correlation algorithm in hand. A server-side feature extractor routine or module 318 may be configured to direct or guide the client-side feature extractor 308 regarding which set of features to extract in a given time-span. In this way, the server node 204 may direct the biometric information processing and capture performed by the testing station 100 and the feature extractor 308.

The resource monitor 310 estimates and controls the available computation and network bandwidth to guide the feature extractor 308 and transport manager 312. The resource monitor 310 ensures that sufficient resources are available to the examinee to provide positive testing experience while at the same time scheduling the monitoring activities to make the best use of the remaining available resources. Computation resource availability metric may be represented in three levels: low (e.g., <10%), medium (e.g., 10-60%), high (e.g., 60-100%). The three levels and the percentages associated therewith may be configured during the set-up or runtime of the exemplary remote test administration system and/or software. The feature extractor module 308 may be configured to store and/or access the computation requirements for individual features (either by looking at the history, or by asking the server which maintains the history of computation requirements of different features for different platforms). Based on these known computational requirements, the resource monitor 310 may determine whether to extract a particular feature locally or remotely at the server node 204. If the examinee is participating in an offline or asynchronous test, then the feature extractor module 308 may simply utilize a list or group of features that can be extracted by the processor 102 without depleting the available computation resources. In this way, key verification information may be gathered and stored locally for later processing by the server node 204 without the need to store and organize large amount of digital image, video or other biometric data.

For managing the bandwidth resource, the resource monitor 310 cooperates with both feature extractor 308 and transport manager 312. Feature extractor module 308 determines and accounts for the computational resource utilization associated with communicating a key-frame to one or more of the server nodes 204 for feature extraction as opposed to performing the feature extraction routine on the capture biometric information or image data locally. Similarly, the transport manager 312 resident or operable in the testing station 100 may determine whether to transport the video/key-frames to the feature extractor 318 resident in one or more server nodes 204 at high or low fidelity or to simply store the video locally to be sent later (for outliers only, for non-outliers, depending on the system configuration, it may not send the video or key-frames to the one or more server nodes 204).

Figure 4:
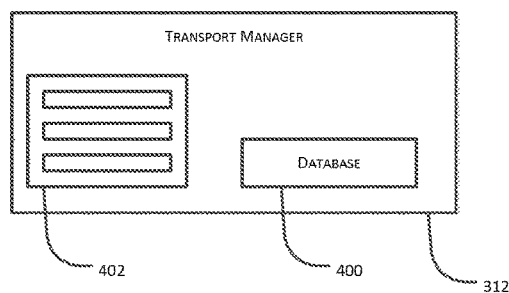
FIG. 4 illustrates an exemplary configuration of a transport manager as disclosed and discussed herein.

The transport manager 312 determines: (1) when to transport a key-frame or a video segment to the server side, (2) how to adjust the fidelity of the video segment such that it can transport the video without interfering with the online test experience, and (3) manages the transport of feature-vectors from the examinee's testing station 100 to the one or more server nodes 204 in a real-time and high priority manner. The transport manager 312 treats the feature vector packets as control packets with a high scheduling priority, and video segments as data packets with a low or lower packet scheduling priority. Transport manager 312 further ensures that the key-frames or video-segments are transferred to the server-side in a privacy-aware manner, i.e. to decide if sending key-frames from the client-side are allowed at a given time and a given probability that the user/client is an outlier. FIG. 4 illustrates an exemplary embodiment of configuration of the transport manager 312 that includes a database or storage module 400 configured to provide long-term storage for biometric information such as a video stream or feature or other information that, due to bandwidth or communication limitations, cannot be transmitted or otherwise provided to the server node 204 for further processing. The transport manager 312 may further include a data queue 402 configured to store or organize data for communication to the server 204 when the bandwidth or communication are available.

Server-side components 304, as the name implies, are configured to execute on one or more of the server nodes 204. The server-side components 304 include: the feature extractor 318; a transport manager 320, a database 322; and a classifier and clustering module 324. The server-side components may further include or cooperate with a streamlining media server configured to encode, transport and process video information and packets over, for example, a TC/IP enable network. In this way, digital video images may be streamed via a WAN and/or LAN between the testing station 100, the server node 204 and the monitoring station 206.

The feature extractor 318 cooperates with the feature extractor 308 resident in the client-side components 300. In operation, the server-side feature extractor 318 cooperates with the client-side feature extractor 310 to ensure that feature vectors are generated from the captured biometric information in a timely manner for further analysis by the classifier and clustering module 324. Typically, the client-side feature extractor 310 does basic feature extraction (e.g., light-feature-set) which is utilized by the classifier and clustering module 324 to determine if the biometric information of the examinee represents an outlier. If client has more computation resources available, more features may be extracted locally and communicated to the server-side feature extractor 318. If the examiner is determined to represent an outlier with probability more than a configurable threshold value (e.g., >0.5.), then the input device 106 may be instructed to communicate a video stream, video-segments and/or keyframes to the server-side feature extractor 318 for a comprehensive analysis of the biometric information and/or feature vectors. In other words, examiner or proctor can vary or adjust the threshold value to take into account factors such as: the number of examinees to be monitored; the actual and perceived sensitivity to errors; and the amount of resources the proctor has (i.e., how many people can the examiner monitor at a given time, how much time is spent answering questions, etc.). Thus, if the examiner sets a low threshold value, more examinees will be flagged as possible outliers which, in turn, requires the examiner to monitor or watch more examinees. Similarly, if threshold is set to a higher value, fewer examinees will be flagged as possible outliers and less of the examiner's attention will be required.

The transport manager 320 facilitates communication between testing station 100 and the server nodes 204. In particular, the transport manager 320 facilitates and directs communication of the extracted feature vector control data provided or determined by the feature extractor 308 as well as the video stream, video-segments and/or keyframes. Keyframes may represent any reduced frame transmission captured by the webcam or camera 106a. For example, typical video may be captured at 24 to 32 frames per second (fps) but a keyframe configuration may reduce the frames per second to 12 fps, a single image capture or any other reduced value in order to conserve communication bandwidth.

The database 322 stores the entire set of feature vectors extracted by both the client and the server-side extractor modules (310 and 318) with time-span stamps.

The classifier and clustering module 324 is configured to mine and analyze the received and/or stored feature vectors in order to identify if a particular examinee, based on his/her feature vector, the time-span stamps and the test, is an outlier. This outlier determination is conducted with respect to the other examinees participating in the same or similar test either synchronously or asynchronously. Asynchronous testing occurs when one or more examinee participate in a test while offline. In this instance, the gathered biometric information may be stored for later analysis. Because the feature vectors are time-stamped with a time-span, the system can identify if an examinee's features are different than other examinees regardless of when the feature vectors were initially gathered. The classifier and clustering module 324 may be executed continuously or periodically as feature vector and other biometric information becomes available. Thus, if the feature vector and other biometric information is made available only at the end of the test, then the classifier and clustering module 324 will typically run or execute at the end. Also, the classifier and clustering module can be configured to correlate the feature vectors of an examinee with not only the feature vectors of examinees giving same or similar test (synchronous case), but also of examinees who may already have finished the test or similar test earlier (asynchronous case). In the asynchronous case, the timestamps associated with the stored feature vectors of past examinees are used to find the subset of stored feature vector data that needs to be correlated with the feature vectors of the current examinee.

Figure 5:
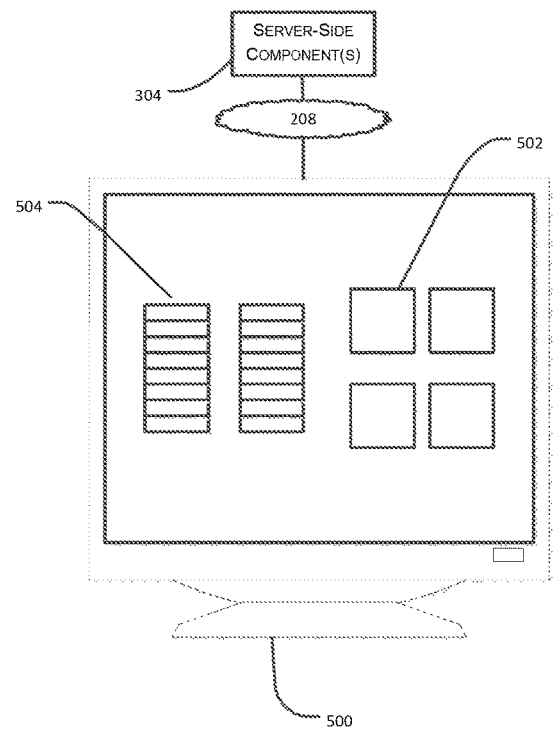
FIG. 5 illustrates an exemplary configuration of a display manager as disclosed and discussed herein.

The admin-side components 306 include (as illustrated in FIG. 5) a monitoring and/or administrator display 500. The monitoring and/or administrator display 500 may be configured to execute or run on multiple monitoring stations 206 to allow several proctors to oversee one or more examinations or tests simultaneously.

The monitoring and/or administrator display 500 presents a prioritized display of all examinee participating in a given online test, where priority is determined by the relative probability that a particular examinee is an outlier (i.e., that a user is engaging in dishonest behavior). Thus, an outlier with high probability of cheating is given larger display area 502 and more prominent position than other students 504 such that the examination administrator can focus and effectively manage a large set of examinees. The display manager 500 periodically receives an update from the transport manager 320 operable in the server-side components 304 to reprioritize the different examinees based on the received feature vectors and the subsequent analysis.

The display manager 500 may further receive streamlining video, etc. to be displayed for a proctor at the monitoring station 206. The display manager 500 displays or provides streaming video, audio, etc. only for examinees that have been determined to represent an outlier. Different or alternate use scenarios may be supported at the display manager 500 in order to, for example, monitor all examinees regardless of their status as an outlier or not for cases where privacy is not a concern.

In operation, a large number of attributes and features may be extracted from biometric information captured by the webcam. These extracted attributes and features, in turn, are useful in identifying an outlier indicative of dishonest behavior. Some of the possible feature extractions are more computationally expensive than others. Similarly, some of the features will be more sensitive to lighting conditions and can more easily be disguised than other features.

Some of the possible feature extractions may include the identification of the number of faces in front of the webcam 106a, the orientations of the examinee's face, and the amount of motion (i.e., a measure of "shiftiness" of the user) within the field of view of the webcam 106a. These attributes can be collected and transformed into a format utilized by the outlier-detection algorithm. For example, the face count acquired at different time-spans or periods may be converted into a fraction of time for which the examinee is not present in front of the computer, and a fraction of time for which there were two or more faces in the view. Similarly, face orientations may be converted into the fraction of time the examinee is looking into the computer or the fraction of time the examinee is looking away from the computer. In other embodiments, other facial or vision recognition algorithms may be utilized to determine, e.g., gaze movement, or mood detection and related attributes.

In other embodiments, the biometric information acquired at the testing station 100 via the input devices 106 may include, for example, audio information and keyboard typing patterns. Audio information may be valuable in determining if the dishonest behavior is being received from outside of the field of view of the webcam 106a. Such dishonest behavior may be identified by correlating an audio level pattern. For example, in non-dishonest behavior use case, the audio information or audio level may be uniform and correspond to the ambient noise level of the surrounding (plus key strokes, which can be removed easily from the audio signal). However, in a dishonest behavior use case, the microphone 106b may capture a non-uniform audio signal that is distinct and different than the ambient noise pattern.

In yet another embodiment, key stroke or keyboard can be utilized to facilitate outlier detection. Typing via the keyboard 106c may be characterized as a series of key strokes with small-pauses in between (depending on the user's typing speed), then a long pause (depending on the user's thought pattern), then again a series of key strokes, and so on. In many cases, the typing pattern of an examinee will change significantly when the examinee is getting external assistance as opposed to when the examinee is engaging in non-dishonest behavior.

In yet another embodiment, the test station 100 may be configured to collect biometric information at different time-spans or periods based on the determined likelihood that the examinee is engaging in dishonest behavior. The specific periods of collection may be associated with the degree to which the examinees behavior is an outlier. For example, if the outlier indicator is high, then the periodicity may be set to a lower value. As the outlier indicator increases, the collection period may likewise be decreased to be able to observe the user more often than non-outliers. For example, the face orientation attribute may be measured once every second (i.e., attribute-period for face-orientation is 1 sec), and assuming that the impression-period is 30 seconds, the number of times the face orientation changed during the impression-period will be computed every 30 seconds.

Figure 6:
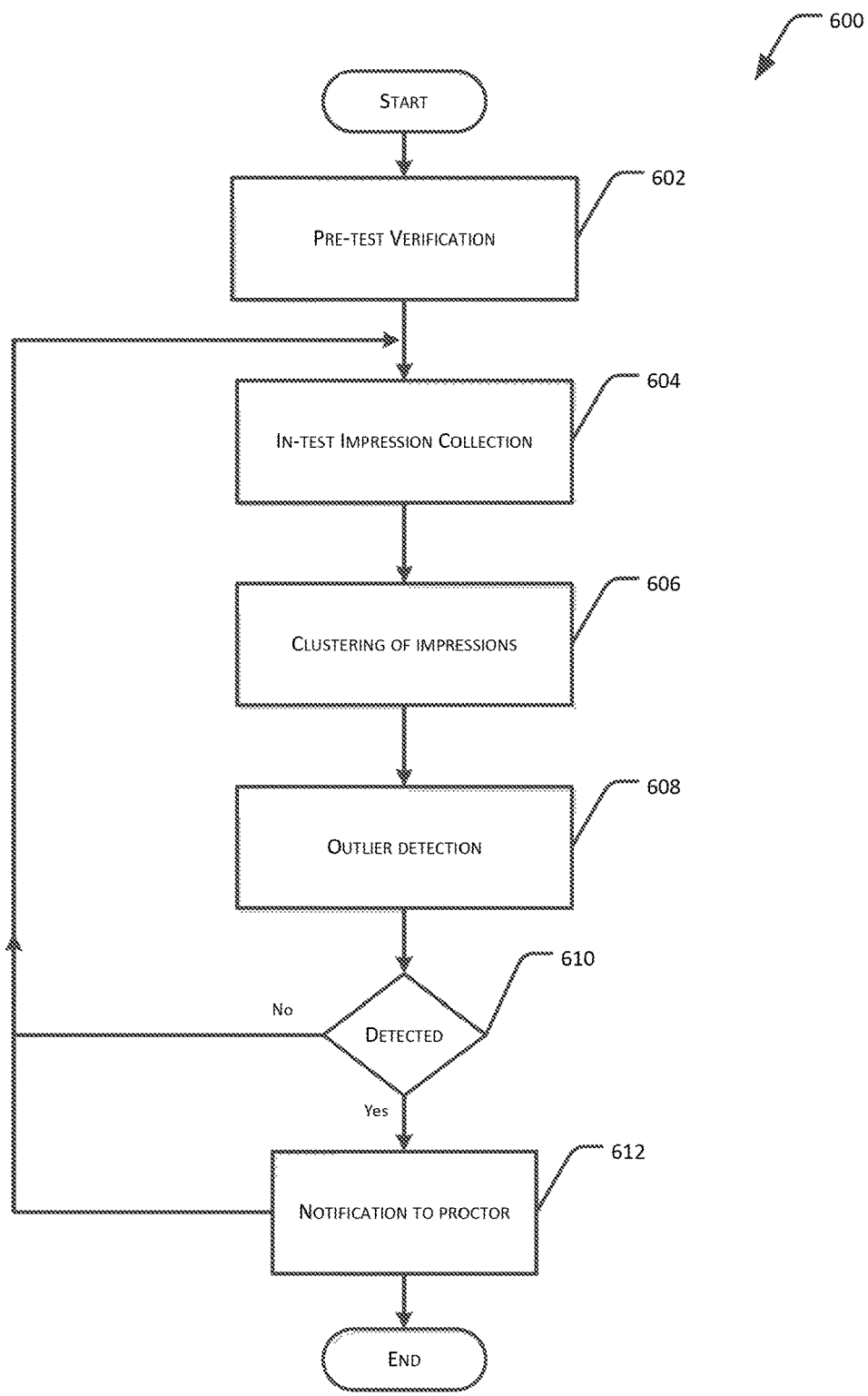
FIG. 6 is an exemplary operation flowchart of an outlier detection routine which may be implemented by the remote test administration system shown in FIG. 2.

FIG. 6 is an exemplary operation flowchart of an outlier detection routine 600 which may be implemented by the one or more elements of the remote test administration system 200 shown in FIG. 2. For example, in operation one or more of the steps or processes depicted and discussed in connection with the outlier detection routine 600 may be performed by the testing station 100 and/or the server node 204. The distribution of the depicted and discussed steps or processes between the different elements and components of the remote test administration system 200 is adaptive based on the available computational resources and communication bandwidth available to each component.

The exemplary remote test administration system 200 may be utilized to monitor multiple examinees simultaneously participating in an online test. In this exemplary embodiment, it will be assumed that each examinee interacts with the online test via an approved and verified laptop having a webcam with camera and microphone. Moreover, the each laptop utilized by an examinee is assumed to have been loaded with and executing software necessary to implement and participate in the remote test administration system 200. As previously discussed, the software may operate as a virtual machine for the duration of the test in order to control (and limit) access to resources which may be utilized in a dishonest manner. Furthermore, each examinee will be assumed to have provided baseline biometric information to the remote test administration system 200 prior to initiating the online exam.

The exemplary outlier detection routine 600 begins, as indicated at block 602, by initiating a pre-test verification of the examinee. The pre-test verification utilizes and compares the baseline (i.e., previously stored) biometric information or values of the examinee to a current set biometric information gathered via the input devices 106. The baseline or stored biometric information or vector may, for example, be provide by an examinee via an external means (e.g., providing a photo-id) or may be collected by proctor or test administrator when the examinee registers the course or online test. Upon completion of the pre-test verification portion, the outlier detection routine 600 executes an in-test impression collection routine (as shown at block 604) to extract relevant biometric features from biometric information gathered periodically throughout the online test via the input device 106. At block 606, the extracted biometric features are processed and arranged via one or more standard clustering algorithms based on the collected features identified in the examinee's biometric information and the collected features of the other examinee's participating in the online test. The outlier detection routine 600 analyzes, at block 608, the clustered collected features and flags the examinee if the collected features are determined to be an outlier with respect to all of the clustered collected features. The outlier detection routine 600 to the in-test collection portion 604 and continues to loop as long as the online test continues. If at any time during the analysis an outlier is identified (see block 610), the proctor at the management station 206 may be notified as indicated at block 612.

The computational aspects and analysis of biometric feature extraction indicated at block 602 and 604, may be implemented at the testing station 100 or the server node 204 depending on, for example, local computation resource availability, availability of network and/or communication bandwidth and any privacy requirements or concerns. For example, if the testing station 100 does not have enough resources to schedule some of the computationally intensive feature extractions but network bandwidth is readily available, the raw biometric information such as the raw digital imagery gathered by the 106a can be transmitted to the server node 204 for feature extraction and processing. Minimal computational and network bandwidth availability can be required in order to ensure that either the testing station 100 possesses the computational resources to affect feature extraction or that the bandwidth is available on the network to communicate the raw data to the server node 204.

Biometric matching and/or comparison as used herein encompasses one or more methods of identity management such as, for example, face or feature recognition, iris match, fingerprint, etc. For example, facial recognition algorithms extract different features of an examinee's face a digital image captured via the webcam 106a. The extracted features define a feature vector such that an exemplary feature set having k-attributes can be represented as $[v_1, v_2, \ldots v_k]$. The remote test administration system 200 may further maintain also the baseline biometric information as a person's authenticated and stored feature vector is $[S_1, S_2, \ldots S_k]$. The match or comparison of these two vectors can be represented and calculated as the dot product of the above two vectors, i.e., $V_1*S_1+V_2*S_2+ \ldots +V_k*S_k$. The greater the values of the dot product, the better or closer the match between the two vectors.

Figure 7A:
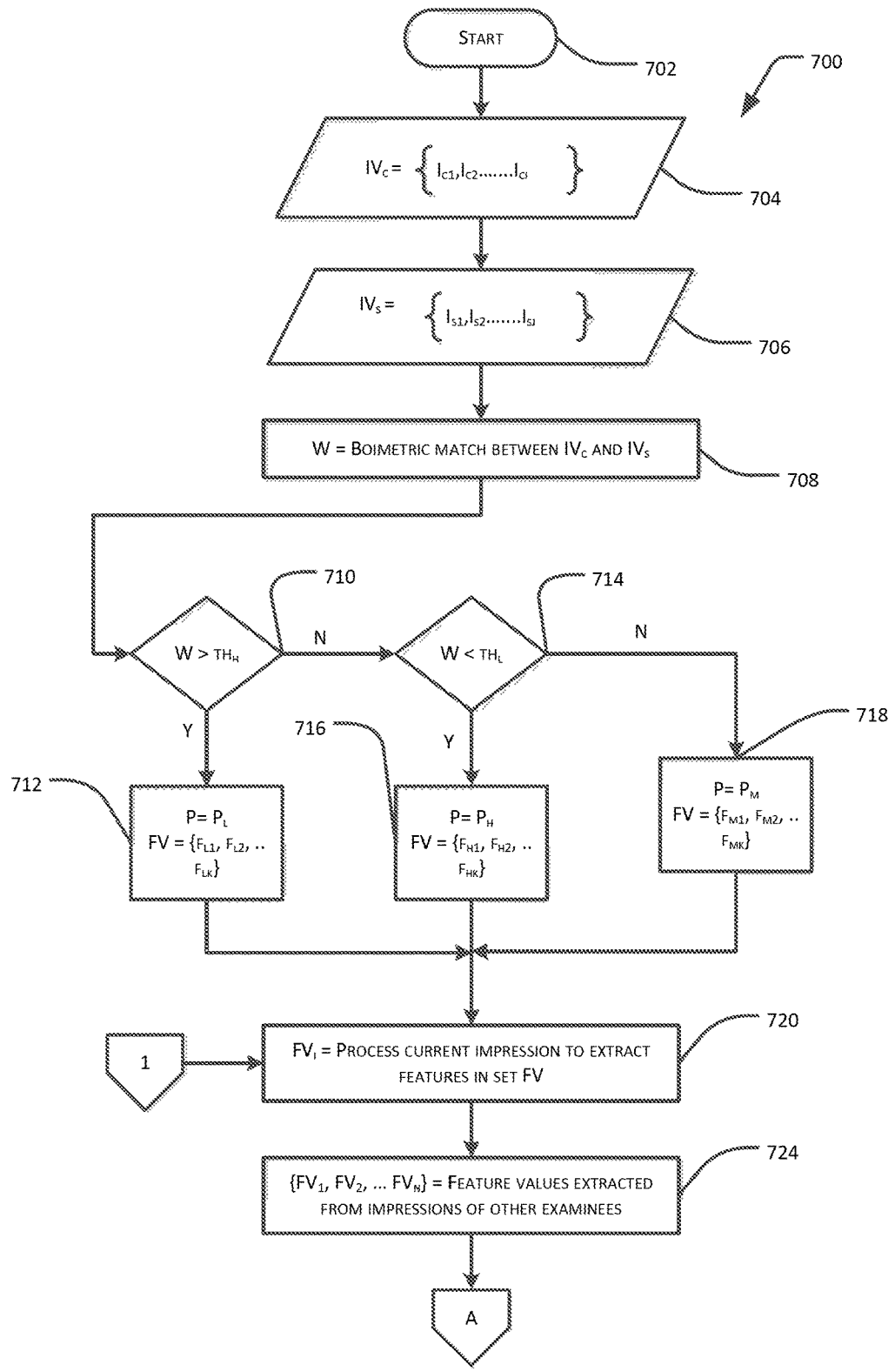
FIGS. 7A and 7B are exemplary and detailed operation flowcharts of the outlier detection routine shown in FIG. 6.
Figure 7B:
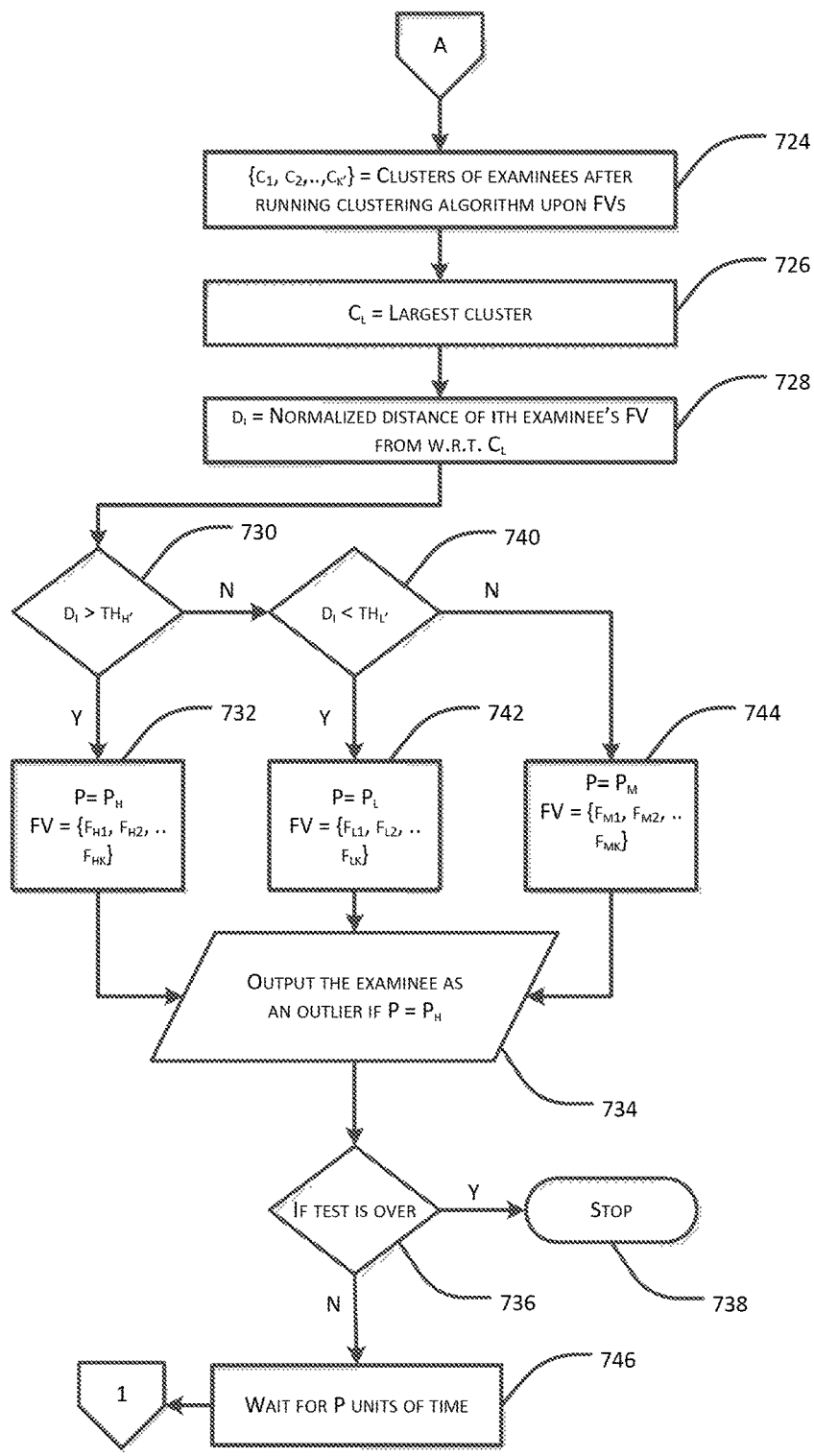

FIGS. 7A and 7B represents a detailed example of an outlier detection routine 700. In this example, it is assumed that: the online test to be administered in a synchronized manner; each examinee is utilizing a testing station 100 with an approved hardware configuration; and each examinee has previously provided biometric information for verification.

The outlier detection routine 700 initiates when the examiner begins a testing session via a virtual machine or interface as indicated at block 702. Upon initiation of the virtual machine, the testing station 100 connects to one or more server nodes 204. The testing station 100, as indicated by block 704, utilizes one or more of the input devices 106 to capture biometric information from the examinee as they initiate the testing session. The server node, at block 706, communicates the previously provided biometric information and/or a set of biometric feature vectors to the testing station 100. The testing station 100 receives the provided set of biometric feature vectors and conducts a comparison with the locally obtain biometric information and/or extracted feature values captured at block 704 to determine a match W (see block 708). If the match W is determined to be greater a high threshold value $th_{eI}$, the outlier detection routine 700 continues with impression collection in a low-doubt $P_I$ mode (see block 710). Low-doubt $P_I$ mode (block 712) indicates that the outlier detection routine considers the likelihood that the examinee is engaging in dishonest behavior to be a low probability (e.g. p<0.2—a configurable parameter). Because the likelihood that the examinee is engaging in dishonest behavior is low, the capture periodicity can be increased (which decreases the biometric information capture rate and subsequent feature extraction) thereby freeing resources which can be used to monitor examinees with a greater likelihood of engaging in dishonest behavior.

However, if the match W is determined to be below a low threshold $th_{eI}$ value (block 714), then client continues with feature extraction in a high-doubt $P_h$ mode (at block 716). High-doubt $P_h$ mode corresponds to a determination that it is highly likely (p>0.5) that the examinee is engaging in dishonest behavior. Accordingly, the periodicity is decreased which results in an increased biometric information capture and feature extraction rates at the testing station 100. Otherwise, the outlier detection routine 700 continues in medium doubt $P_m$ mode as indicated by block 718. Medium doubt $P_m$ mode corresponds to a capture periodicity is set to a medium value (e.g. 30 seconds) and remote test administration system 200 configures the outlier detection routine 700 to extract only the most relevant attributes. The relative relevance of each attribute may be predefined and/or customized. For example, the relevant feature(s) or attribute(s) may be defined to be facial detection and facial orientation as visual cues and audio-level as the non-visual cue. High doubt $P_h$ mode provides for streaming video between the testing station 100, the server node 204 and one or more of the monitoring stations 206 for manual monitoring. Furthermore, high doubt $P_h$ mode further provides for a deeper or more thorough feature extraction including audio transcription analysis, eye-movement analysis and keyboard typing pattern analysis.

With the above initialization completed, the outlier detection routine 700, at block 720, begins a loop where the locally captured biometric information is extracted according to the previously defined and discussed doubt modes. The outlier detection routine 700 may further gather and organize biometric information and/or extracted feature vectors from other examinees participating in the online test (or a similar test) as shown at block 722. The feature vectors and/or biometric information may include or be supplemented by contextual cues (IP address, Test topic, Test duration, Test type, Examinee's prior data).

At block 724, different clustering algorithms or routines at be implemented to further cluster and organize the extracted feature vectors such as K-means clustering, hierarchical clustering, and expectation maximization (EM). After the clustering, the server node 206 produces a set of cluster of examinees where each cluster represents examinees with similar feature vector. The largest cluster is considered to correspond to the cluster of students that are not engaging in dishonest behavior (see block 726).

At block 728, the distance $d_i$ between the centroid of the largest cluster and the current, locally captured examinee feature vector may be calculated. If, at block 730, the distance $d_i$ is greater than a threshold $th_h'$ distance, then at block 732, the examinee is identified to have a high likelihood of engaging in dishonest behavior. Which, in turn, results in the examinee's biometric information capture periodicity being set to a high value and the examinee being flagged as an outlier (see block 734). Subsequently, at block 736, a timer value is checked to see if the online test is still in process. If the time for the online test has expired, then at block 738 the outlier detection routine 700 ends. However, if the online test is still in process then the online detection routine 700 pauses (block 746) before returning to the beginning of the loop started at block 720. The length of the pause is proportional to its periodicity value associated with the previously discussed high, medium and low modes.

If, at block 740, the distance $d_i$ is less than a threshold $th_h'$ distance, then at block 742, the examinee is identified to have a low likelihood of engaging in dishonest behavior. Which, in turn, results in the examinee's biometric information capture periodicity being set to a low value. Otherwise, the examinee is identified to have a medium likelihood of engaging in dishonest behavior (see block 744). As previously discussed, the status of the online test is determined and the loop portion of the outlier detection routine 700 continues until the time for the test is determined to have ended.

In one exemplary embodiment, the clustering algorithm 724 is a k-means clustering algorithm. The k-means clustering algorithm consists of the following steps:

1. For a specified number of k clusters, the clusters are initialized at random. An examinee is then selected from the input dataset and assigned to a cluster where each cluster is initialized with different data points (examinees).

2. Associate each of the data items with the cluster that is closest (most similar) to it. Utilize the dot product between the cluster and the data item to measure the closeness (similarity). The higher the dot product, the closer the two points.

3. Re-compute the centers of the clusters using the data items associated with the cluster.

4. Continue steps 2 and 3 until there are no more changes in the association between data items and the clusters. At times, one or more data items may oscillate between two clusters, causing the clustering algorithm to not converge. It may be desirable to include a maximum number of iterations.

In the context of the above algorithm, each data point represents one examinee. The k-means algorithm may be executed such that k=N/10, where N is the number of examinees. In this manner, the clustering algorithm results in N/10 clusters and the largest cluster represents the "normal" examinees participating in the online exam and other, smaller clusters represent the outliers.

Figure 8:
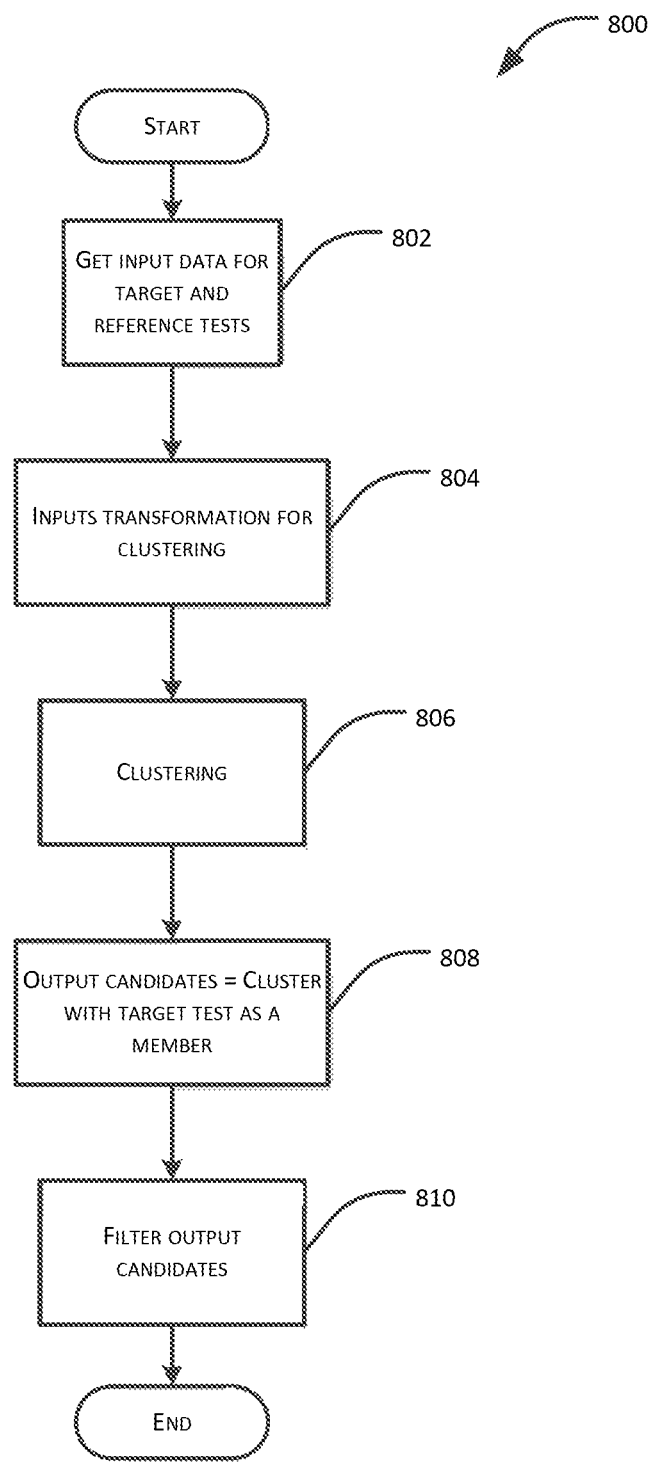
FIG. 8 is an exemplary operation flowchart of an test similarity detection routine which may be implemented by the remote test administration system shown in FIG. 2.

FIG. 8 illustrates a test similarity detection algorithm 800 utilized to detect and quantify the similarities between two given tests. Tests are considered similar if the impressions of examinees participating in one test can be used or combined with those of another test in order to identify outliers. The test similarity detection algorithm 800 may be utilized to analyzing and combine tests that do not alone have a large number of simultaneous and synchronous examinees.

The test similarity detection algorithm 800 inputs are a single target test, and a set of reference tests. The test similarity detection algorithm 800, in turn, generates as an output a subset of the reference tests that can be combined with and/or utilized to evaluate the examinees participating in the target test. The test similarity detection algorithm 800 includes or begins by gathering the relevant attributes about the tests to be correlated as shown at block 802. The input values are, in turn, transformed into a data set on which clustering can be performed (see block 804). The transformed values are then clustered utilizing, for example, the k-means algorithm discussed above to group or organize the cluster of tests that contains the target test (see block 808). A filter may further be applied to the organized cluster to improve the accuracy of the generated output as shown at block 810.

Figure 9:
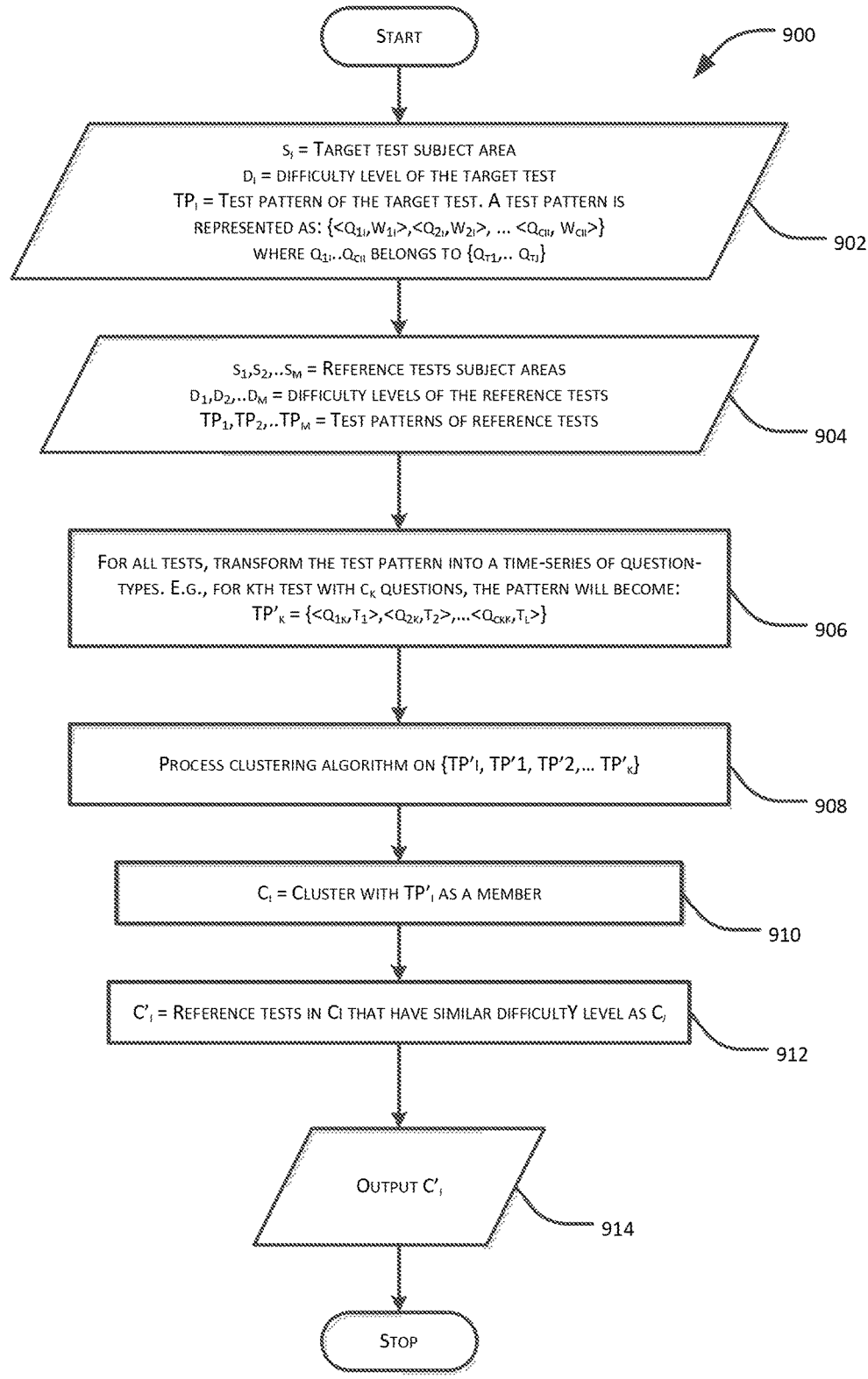
FIG. 9 is an exemplary and detailed operation flowchart of the outlier detection routine shown in FIG. 8.

FIG. 9 illustrates another embodiment of a test similarity detection algorithm 900. As the test similarity detection algorithm 900 initializes, attribute information about the target test may be collected as indicated at block 902. The attribute information includes, for example, the test subject, the question pattern (multiple-choice or subjective, numerical etc.): expressed as a series of tuples representing question-type and weight pairs, where the weight shows the associated mark for that particular question, and the difficultly level. The same set of attributes is also collected for the reference tests (see block 904).

Subsequently, at block 906, the test similarity detection algorithm 900 transforms and converts the question pattern into time series data where a question occupies a duration of time in proportion to its weight. For example, consider a 10-minutes test with four questions, with a question pattern of {<q1, 1>,<q2, 2>,<q3, 1>, <q4,1>}, where q2 is of twice as weight as other questions, thus the total weight being 5. In other words, q1 with weight 1 may be thought as occupying 2-minute slot in a timer series representing the test duration. Thus, above question pattern will be transformed into a time series with ten values, each value representing 1-minute duration: {q1, q1, q2, q2, q2, q2, q3, q3, q4, q4}. The above series can be also represented, as shown in block 906, as {<q1,2>, <q2, 4>, <q3, 2>, <q4,2>}. It is assumed that each of the reference tests has the same value of total weightage as the target test. If the total weightages are different but the tests are of equal duration, then the weightage can be normalized and still be used for similarity consideration. At block 908, the transformed and weighted tests, question patterns, etc. are analyzed and clustered to generate a combined cluster such that tests with similar question patterns end up staying close to each other in the output.

The output, as indicated at block 910, includes the cluster having the target test (from block 902) as a member. The distances between the target test and all other reference tests are computed. The reference tests within the identified cluster are those tests that are determined to have distances less than a threshold value. The threshold value assures that the reference tests within the identified cluster are sufficiently close in difficulty level to the target test. The reference tests are then, as indicated at block 912, filtered to select tests that belong to same subject area as the target test. The filtered results are, as indicated at block 914, the output of the test similarity detection algorithm 900. The filtered results may now be utilized to evaluate the behavior of examinees taking different, but structurally related, tests.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed:

1. A system for test administration including a memory in communication with a processor and a biometric reading unit with a program in the memory executing the steps of:
   receiving measurements from the biometric reading unit at a first rate;
   identifying at least one biometric vector in the biometric measurements, wherein the biometric vector indicating a behavior characteristic indicative of cheating occurring on a test being taken at a testing station;
   communicating the identified biometric vector to a centralized monitoring station for compiling with a plurality of identified biometric vectors acquired from a plurality of different users;
   receiving an reference biometric vector from a central monitoring station;
   comparing the identified biometric vector with the reference biometric vector and determine a recognition weight;
   grouping the identified biometric vector into one or more polling clusters based on the recognition weight and one or more recognition thresholds and monitoring the user at the testing station based on feature vectors associated with the one or more polling clusters;
   recording a video feed from the testing station in response to the identified biometric vector matching the reference biometric vector; and
   transmitting the video feed to the central monitoring station for review.

* * * * *